United States Patent
Khandelwal et al.

(10) Patent No.: US 11,054,281 B1
(45) Date of Patent: Jul. 6, 2021

(54) SMART ENERGY METER HOUSING

(71) Applicant: Honeywell International Inc., Morris Plains, NJ (US)

(72) Inventors: Akshay Khandelwal, Jaipur (IN); Karma Bhutia, Hyderabad (IN); Suresh Kumar Palle, Karnataka (IN); Murajith Muraleedharan, Hyderabad (IN); Krishna Mohan, Hyderabad (IN); Nitin Agarwal, Sarai Faridabad (IN); Sai Kiran Lella, Hyderabad (IN); Ramaiah Chowdary, Hyderabad (IN); Bramari Tatavarthy, Kukatapally (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/782,967

(22) Filed: Feb. 5, 2020

(51) Int. Cl.
*G01D 4/00* (2006.01)
*G06Q 50/06* (2012.01)
*G01D 4/04* (2006.01)
*G06Q 20/14* (2012.01)

(52) U.S. Cl.
CPC ............... *G01D 4/002* (2013.01); *G01D 4/04* (2013.01); *G06Q 20/145* (2013.01); *G06Q 50/06* (2013.01); *G01D 4/008* (2013.01)

(58) Field of Classification Search
CPC .......... G01D 4/002; G01D 4/04; G01D 4/008; G01D 11/24; G01D 11/245; G06Q 20/145; G06Q 50/06; H04Q 9/00; H04Q 2209/00; H04Q 2209/60
See application file for complete search history.

(56) References Cited

U.S. PATENT DOCUMENTS

| | | | |
|---|---|---|---|
| 6,737,855 B2 * | 5/2004 | Huber | G01R 22/065 324/156 |
| 7,500,701 B2 * | 3/2009 | Lalancette | F16B 5/0275 292/256 |
| 8,228,209 B2 | 7/2012 | Smith | |
| 9,383,223 B2 | 7/2016 | Wang | |
| 9,615,150 B2 | 4/2017 | Kashiwagi et al. | |
| 10,310,459 B2 | 6/2019 | Gross et al. | |
| 2015/0258893 A1 * | 9/2015 | Gray | B60K 31/00 701/93 |
| 2016/0011005 A1 | 1/2016 | Wang | |
| 2016/0268983 A1 | 9/2016 | Matsuno | |
| 2019/0320025 A1 | 10/2019 | Breter et al. | |

* cited by examiner

*Primary Examiner* — Franklin D Balseca
(74) *Attorney, Agent, or Firm* — Ortiz & Lopez, PLLC; Kermit D. Lopez; Luis M. Ortiz (57) ABSTRACT

A meter casing can include a metal shield, and an outer casing that includes a display screen cavity that maintains a display screen, an optical port cavity that houses an optical port sensor assembly including a dongle, and a seal button cavity that houses a seal button and a sealing element. The seal button cavity can include one or more recess cavities formed in the communications module cover. The optical port cavity can include a circular port to securely mount the dongle. In addition, snap joints can be provided, which can hold an optical port cover that covers the optical port with respect to the optical port cavity.

20 Claims, 4 Drawing Sheets

SMART ENERGY METER HOUSING

TECHNICAL FIELD

Embodiments are related to the field of energy metering systems and smart meters.

BACKGROUND

So-called "smart" meters are beginning to replace legacy meters in utility applications. Smart meters can provide a plethora of metering avenues for utilities. The functioning of such meters has been found to offer superior performance and efficiencies than the use of legacy meters.

A smart meter generally records digital electric, water, and/or gas meter consumptions in intervals and communicates information via a communications network (e.g., a wireless communications networks) back to a utility company for monitoring and billing purposes (e.g., telemetering). Smart meters may use wireless technologies for communicating with the utility company. A smart meter can also shut off or suspend the delivery of utility services, under any condition. A smart meter can also facilitate load balancing, emergency shut-offs, and so on, etc.

Conventional metering devices including both legacy and smart meters are not compact. Conventional meters, for example, possess protruding seals and panels, which are not flush. Non-flush panels and protruding elements render the smart meter unsafe for usage. Many of today's energy metering systems including both residential and commercial electric and gas meters are bulky and not convenient to use or integrate with new or existing infrastructure. Mounting pedestals for self-contained meters, for example, are also bulky and costly, and are difficult to integrate with adjoining systems. With the accelerating growth of distributed energy systems and mobile transportation and infrastructure, it would be desirable to provide energy metering systems that can be easily and unobtrusively integrated with the existing utility infrastructure to provide convenient energy delivery, and real time consumption monitoring and transactions.

Accordingly, there is a need for smart meters, which can include flush panels, minimum protruding elements while also being simple to install and use. Furthermore, utility companies desired smart meters that are easy to manufacture. In addition, there is also a desire among utility companies to manufacture smart meters, which are modular, based on layers, and easy to assemble.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide an improved metering system.

It is another aspect of the disclosed embodiments to provide for an improved smart meter having a meter casing that includes a metal shield and a communications cover.

It is also an aspect of the disclosed embodiments to provide an improved smart meter that incorporates a communications module cover that houses a communications module that includes a display screen cavity, an optical port cavity and a seal button cavity.

The aforementioned aspects and other objectives can now be achieved as described herein. In an embodiment, a meter casing can include a metal shield and an outer casing comprising a display screen cavity that maintains a display screen; an optical port cavity that houses an optical port sensor assembly including a dongle; and a seal button cavity that houses a seal button and a sealing element. The seal button cavity can include at least one recess cavity formed in the communications module cover.

In an embodiment of the meter casing, the optical port cavity can include a circular port to securely mount the dongle.

In an embodiment of the meter casing, snap joints can be used for holding an optical port cover that covers the optical port with respect to the optical port cavity.

In an embodiment of the meter casing, the dongle can include a magnet to fix onto the optical port cavity.

In an embodiment of the meter casing, the at least one recess cavity can include a right-side recess cavity formed in the outer casing; a left-side recess cavity formed in the outer casing; and a button recess cavity formed within the seal button.

In an embodiment of the meter casing, the at least one recess cavity can be operable to receive the sealing element passing through the right-side recess cavity, the button recess cavity and the left-side recess cavity.

In an embodiment of the meter casing, a terminal cover can be attached to the outer casing with snaps.

In an embodiment of the meter casing, the metal shield can be configured to receive the outer casing.

In an embodiment of the meter casing, the metal shield can be configured to receive the seal button and the dongle.

In an embodiment of the meter casing, the recess cavity can be configured to restrict the movement of the sealing element.

In an embodiment, a metering system can include a metal shield; an outer casing that includes at least one display screen and houses a communications module operable to communicate data, wherein at least some of the data is displayable on the at least one display screen, wherein the outer casing further includes an optical port that maintains a dongle, and a seal button cavity that maintains a seal button and a seal, wherein the seal button cavity comprises at least one recess cavity formed in the outer casing; and a terminal cover that houses a plurality of terminal for establishing a phase connection.

In an embodiment of the metering system, the outer casing can include a communications module cavity, wherein the communications module is housed in the communications module cavity formed in the outer casing.

In an embodiment of the metering system, the optical port can include a circular optical port cavity formed in the meter casing to securely mount the dongle.

In an embodiment of the metering system, the at least one recess cavity can include a right-side recess cavity formed in the outer casing; a left-side recess cavity formed in the outer casing; and a button recess cavity formed within the seal button.

In an embodiment of the metering system, the at least one recess cavity ca be operable to receive a sealing element passing through the right-side recess cavity, the button recess cavity and the left-side recess cavity.

In an embodiment of the metering system, the dongle can include a magnet that affixes to the optical port cavity.

In an embodiment of the metering system, an optical port covering can be provided having snaps for holding the optical port cover to the optical port.

In an embodiment of the metering system, a terminal cover can be attached to the communications module cover with snaps, and the metal shield can be configured to receive the communications module cover.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments relate to metering systems and methods for monitoring consumption of a commodity, such as electricity. It is understood that the systems and methods described herein may be implemented in systems that monitor consumption of other commodities, such as, for example, water or gas. In one embodiment, the metering system can include a plurality of meters communicatively connected to a head-end system. Such a connection may be a physical connection such as a cable between the meter and the head-end system, a wireless RF connection, or other means.

Smart meters have the ability to issue notifications to a control system. During the communication, the control system may function to log and record various events, errors, and/or warnings in the plurality of meters. These events, errors, and/or warnings may be recorded in tables and stored in a meter memory. The tables may be accesses and/or sent to the control system and verified.

Figure 1:
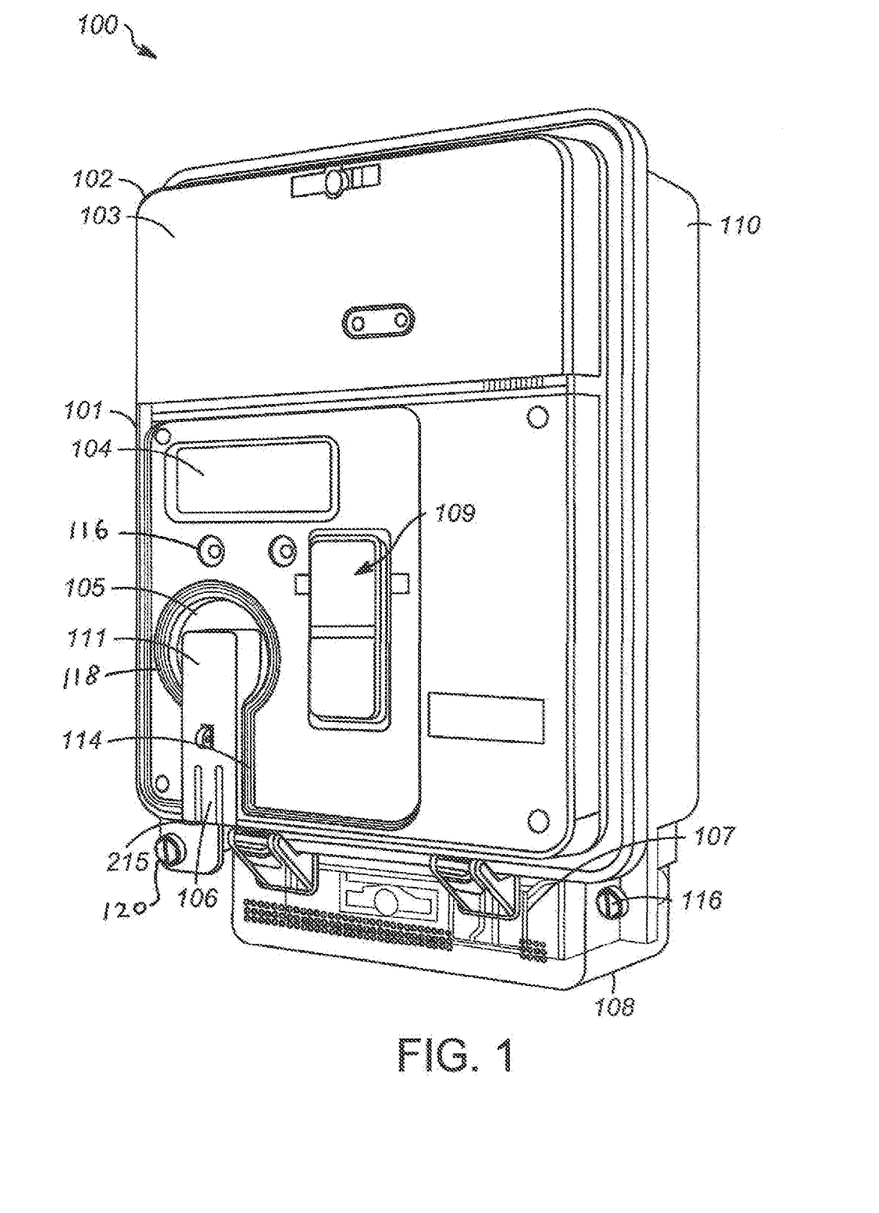
FIG. 1 illustrates a smart meter, in accordance with an embodiment.

FIG. 1 illustrates a smart meter 100 in accordance with an embodiment. The smart meter 100 can include an outer casing 101, a communications module 102, a communications module cover 103, a display screen 104 (e.g., an LCD display screen), an optical port cavity 105, an optical port cavity cover 106, a plurality of terminals 107, a terminal cover 108, a seal button assembly 109, and a base 110 (e.g. a mounting base). The smart meter 100 additionally can include an LED 116 that can provide meter status, and also an optical port access 118 for data collection. In addition, utility seals 120 can be provided for tampering protection.

The communications module 102 can form the upper portion of the smart meter 100. The communications module 102 can be implemented as a main unit that can be operable to communicate with both inside and outside of the periphery where the smart meter is installed. Outside the periphery, the communications module 102 can use a Wide Area Network (WAN) to transmit and receive data regarding meter readings to a utility company. Within the periphery the communications module 102 may use a Local Area Network (LAN) to communicate with other smart appliances available within the periphery. The communications module 102 may communicate through WAN or LAN using wireless technologies.

The display screen 104, an optical port 111, an optical port cavity cover 106 and the seal button assembly 109 can form a middle portion of the smart meter 100. The display screen 104 can be provided at the topmost part of the middle portion of the smart meter 100. The display screen 104 can function as an information display unit that can be configured to display information for the utility company and the customer. The optical port 111 and the seal button assembly 109 can be provided immediately below the display screen 104.

The optical port 111 can provide a local access point for utility companies on the smart meter 100. The optical port 111 provided on the smart meter 100 may be implemented as a standard optical port used to communicate with the smart meter 100. The optical port 111 can permit a dongle 212 to be mounted thereupon, which can create an interface to the smart meter 100. The optical port 111 can allow for the permanent attachment of dongles 212 or modems, and can form gateways for installations, and related functionalities and data collection.

The optical port cavity 105 area can comprise a circular cavity, which can maintain or hold the dongle 212 in a secure manner. Cutting out and forming a circular shape from the outer casing 101 can form the optical port cavity 105. The optical port cavity 105 can further extend up to the bottom of the middle portion of the smart meter. The optical port cavity 105 formed around the optical port can restrict the movement of the dongle, thereby providing a firm station for the dongle. As a result, the dongle 212 can remain securely mounted for long durations without attracting any vertical or horizontal movement. The optical port cavity 105 can also include an optical port cover 106, which can be hinged by snap joints 215 to the lower part of the middle portion of the smart meter 100. The optical port cover 106 can be configured to enclose the optical port 111 such that the optical port 111 may not be accessed once the optical port cover 106 is applied on the optical port 111.

The optical port cavity 105 can include an optical port cover cavity 114 formed in the outer casing 101, which can continue from the optical port area up to the snap joints 215 and can house the optical port cover 106. The optical port cover 106 can be housed in the optical port cavity 105 when the optical port cover 106 is moved on the snap fit hinge 215 to cover the optical port 111. The optical port cover cavity 114 can be formed as a mold on the outer casing 101. The optical port cover cavity 114 can also encapsulate the optical port cover 106 when the cover is applied on the optical port.

The optical port cover cavity 114 can include a locking mechanism 210 for the optical port cover 106, formed below the optical port 111 on the outer casing 101. The locking mechanism 210 can protrude from the surface of the outer casing 101 and can be configured to pass through a cavity formed within the optical port cover 206. The locking mechanism 210 can be provided between the optical port cavity 114 and snap fit joints of the optical port cover 106. The locking mechanism 210 can include a protruding element having a hole 211 provided therein.

The seal button assembly 109 can be provided in the smart meter 100 below the display screen 104. The seal button assembly 109 can be fitted to detect tampering and to deter unauthorized access of the smart meter 100. This feature can protect the integrity of user information. The seal button assembly 109 usually has a sealing element formed preferably from a metal wire. The metal wire can pass through the seal button assembly and can be wound in a manner such as to arrest the movement of the button.

The lower portion of the smart meter 100 can include a terminal box having a group of terminals 107, a metal wiring and a terminal cover 108. The group of terminals 107 can be used for establishing phase connections. Screws 116 can be configured to fix the metal wiring onto the respective terminals. The terminal cover 108 can encapsulate the group of terminals 107 and the metal wiring, thus protecting these components from any unauthorized access. The terminal cover 108 can be hinged at the bottom of the middle portion of the smart meter 100.

Figure 2A:
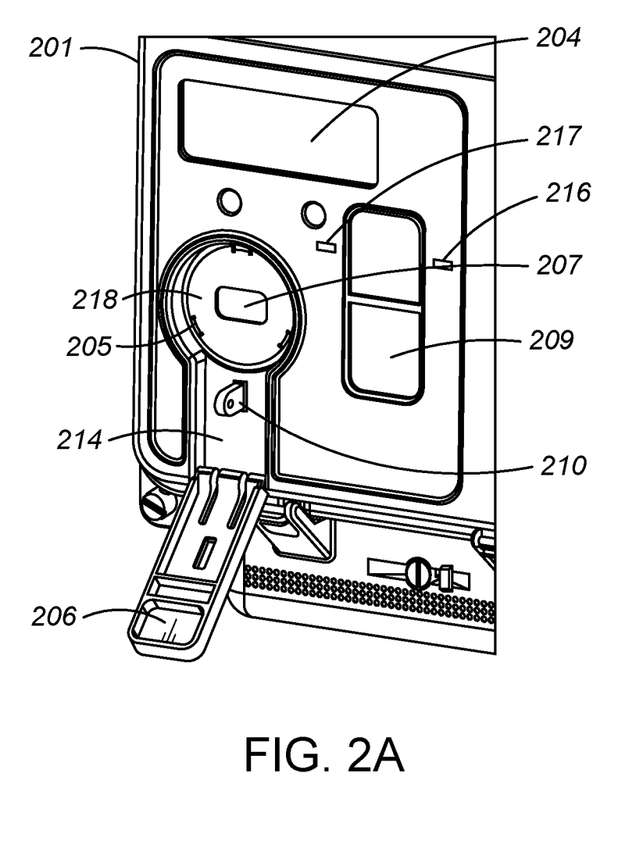
FIG. 2A and FIG. 2B illustrate exploded views of the smart meter shown in FIG. 1, in accordance with an embodiment.

FIG. 2A illustrates an optical port assembly, in accordance with an embodiment. FIG. 2A depicts a portion of the previously discussed smart meter 100. The portion shown in FIG. 2A includes the optical port cavity 205, seal button 209, optical port cover cavity 214, right side recess 216, left side recess 217, metal plate 218, snap joints 215 and a display screen 204. The optical port cavity 205 can be formed by a circular cavity formed in the outer casing 201 of the smart meter. Cutting out a circular portion of the outer casing 201 can form the optical port cavity 205 in the outer casing 201. A metal plate 218 can be arranged in the optical port cavity 205. The metal plate 218 placed in the optical port cavity 205 can be configured to hold the dongle 212 by a magnetic means.

The optical port cavity can include an optical port access 207. The optical port access 207 can form the gateway for establishing communication between the dongle 212 and the smart meter 100. The dongle 212 can connect to the internal circuitry of the smart meter 100 at optical port access 207. The dongle 212 can include a circular magnet arranged within the dongle 212. When the dongle 212 is mounted on the optical port access 207, the magnet of the dongle 212 can be attracted to the metal plate 218 provided in the optical port cavity 205. The optical port cover 206 can be configured to cover the optical port access 207, the optical port cavity 205 and optical port cover cavity 214, when the dongle 212 is not in use.

The optical port cover 206 can be attached to the outer casing 201, just below the optical port cover cavity 214 through snap joints 215. These snap joints 215 are easy to install and assemble. The locking mechanism 210 can be configured to pass through a cavity 212 provided in the optical port 205, when the optical port cover 206 latches on cover the optical port access 207. The cavity 212 can be configured to house the locking mechanism 210 when the optical port cover 206 is moved pivotally at the snap joints 215 to cover the optical port access 207. Subsequent to the closure of the optical port cover 206, a wire preferably of metal, may be used to lock the optical port cover 206 by inserting the wire in the hole 211 formed in the locking mechanism 210, thus preventing any unauthorized access of the smart meter.

Figure 2B:
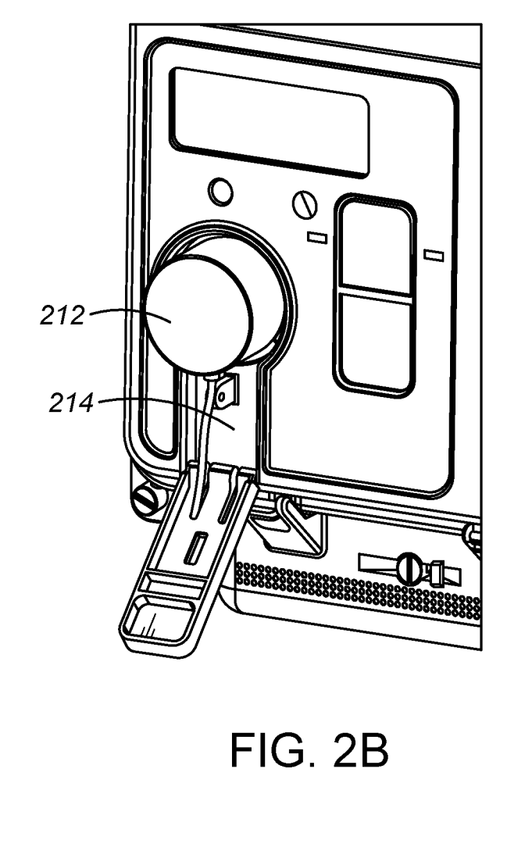

FIG. 2B illustrates a dongle 212 that can be placed in the smart meter 100, in accordance with an embodiment. The dongle 212 can be securely mounted on the optical port access and can cover the optical port cavity 205 in its entirety. The dongle 212 can also include a magnet 221, which can hold onto the metal plate 218. The optical port cavity 205 can secure the dongle 212 in a manner that restricts the movement of the dongle 212 in any direction, thereby eliminating the danger of the dongle 212 moving away from the optical port cavity 205.

Figure 3A:
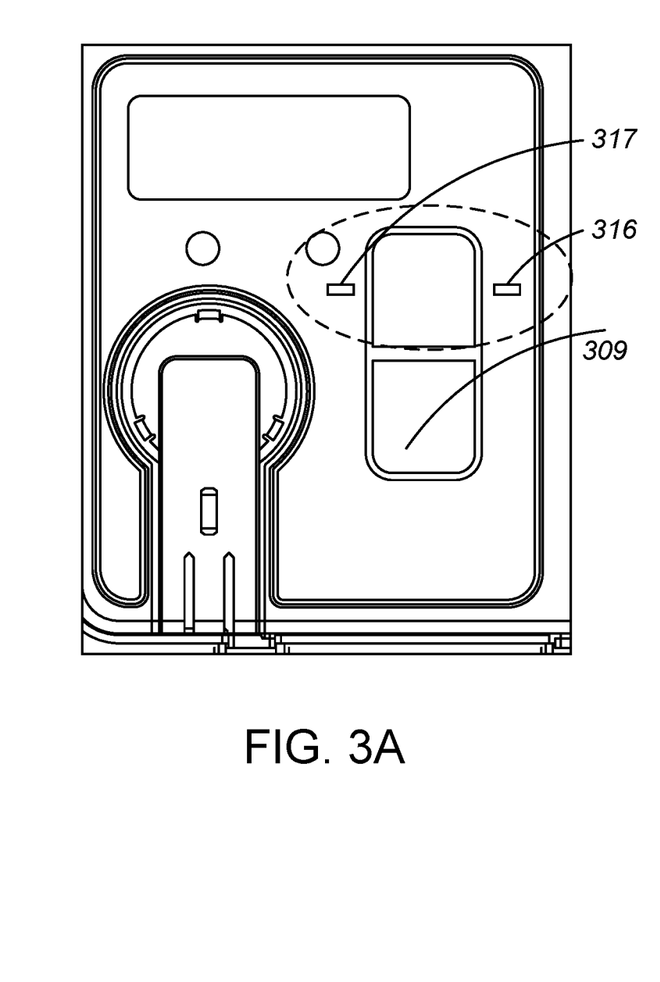
FIG. 3 illustrates a diagram depicting a recess formation, in accordance with an embodiment.
Figure 3B:
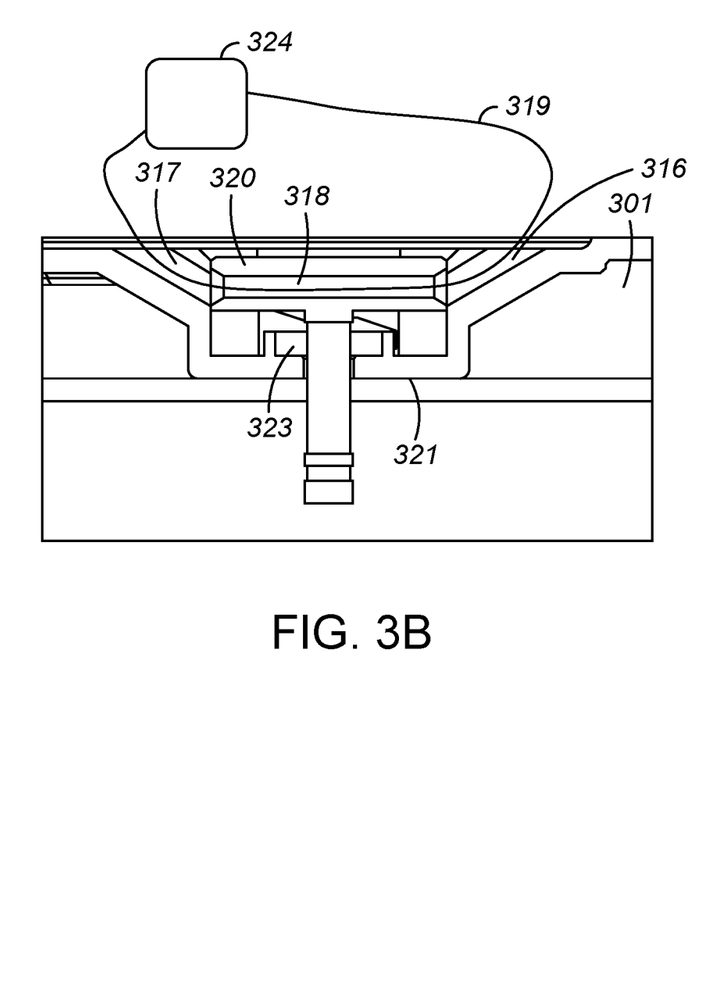

FIG. 3 illustrates the seal button assembly 109, 209, in accordance with an embodiment. The seal button assembly 109, 209 can include a plurality of recess cavities 316, 317, 318, a sealing element 319, a securing mechanism 324 and a plurality of buttons 320. At least one of the plurality of recesses 318 can be formed in the seal button 320 and in the outer casing 301 of the smart meter 100. The recesses 316, 317, 318 together can form a pathway for the sealing element 319 to pass through so as to arrest the function of the button.

The outer casing 301 of the smart meter 100 can be configured with a seal button cavity 321 formed in the outer body. The said seal button cavity 321 can be configured to house the seal button 309 and the sealing element 319. The seal button 309 can be securely placed in the seal button cavity 321 via snap fit joints 323. The seal button 309, when placed in the seal button cavity 321, can be releasably connected to the outer casing 301 of the smart meter by the snap fit joints 323. The seal button 309 can include a male connector and the seal button cavity 321 can include a female portion. The male connector may be associated with the female and releasably secured therein.

The recesses 316 and 317 can be formed in the outer casing 101, 201, 301 of the smart meter 100. The seal button 309 can include a button recess cavity 318, which can be formed below the surface of the seal button 309. The recess 318 can be configured to align with the recesses 316 and 317 such that they form a pathway for the sealing element 319. The sealing element 319 can pass through the recess cavities 316, 318 and 317 and can be secured by a securing mechanism 324. The sealing element along with the securing mechanism 324 may prevent unauthorized access to the function switches underlying the smart meter.

The disclosed embodiments can solve four major shortcomings of existing meters. First, the need to wear conventional seal elements generally present at the sides of the outer surface of the meters is less resistant with respect to theft. Second, the conventional sealing element structure, which can include metal wires wound at the sides of the meters, can lead to serious environmental issues, and also long-term exposure may be hazardous. Lastly, conventional seals are not favorable to digital management and automation.

Figure 4:
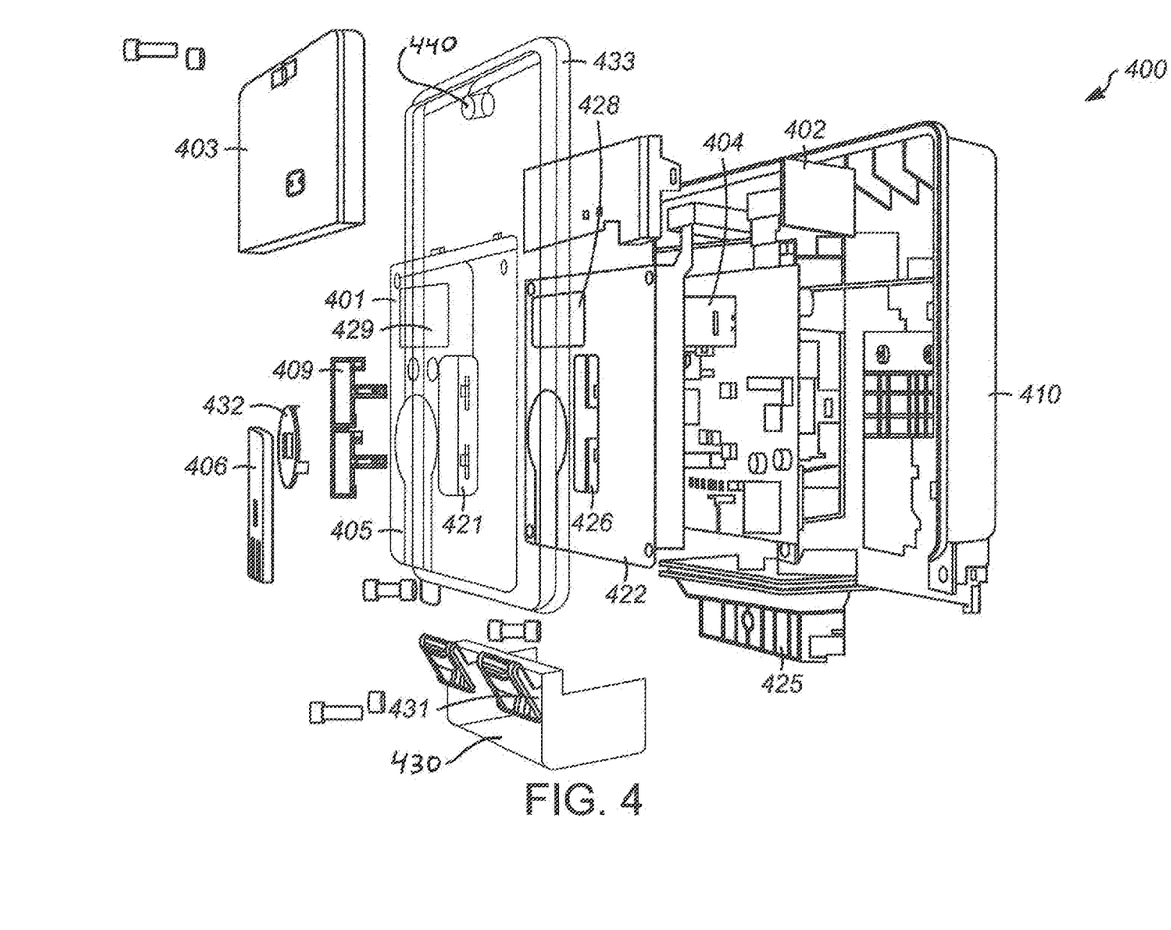
FIG. 4 illustrates a diagram depicting an exploded view of a smart meter, in accordance with an embodiment.

FIG. 4 discloses an exploded view of the smart meter 100, in accordance with an embodiment. The exploded view depicted in FIG. 4 illustrates a base 410, a terminal block 425, the communications module 402, a metal shield 422, a communications module cover 403, the outer casing 401, at least one seal button 409, the metal plate 418, the optical port cover 406 and the terminal cover 430. The base 410 can form the mold within which the communications module 402 may be housed. The base 410 can protect the communications module 402 from being damaged. The base 410 also has mounts, which can be used for mounting the smart meter to a wall or any such area.

The communications module 402 can include an electronic board, which can house the electronics responsible for the functioning of the smart meter. The communications module 402 can be mounted within the base of the smart meter 400. The communications module 402 can also include the display screen 404 and the optical port. The display screen 404 and the optical port can be formed on the communications module 402. The communications module 402 can provide function switches for reset and start stop. The communications module 402 can function to achieve remote meter reading at configurable intervals, time of the day metering, and pre-paid functionalities, which can enable the meter to function on a recharge basis.

Other functionalities can include alarm event detection remote load connection and disconnection based on demand, remote firmware upgrade, integration with utility software for billing collections, import of legacy data from existing models, and lastly security features which can prevent unauthorized access to the smart meter functionality. The communications module 402 can accurately maintain system time synchronization across all functions to ensure accuracy of data. The communications module 402 can further support the interfacing with Smart Grid functionalities such as an outage management system, distribution automation including a self-healing system, distribution transformer monitoring units, distributed energy resources, etc. The communications module 402 can support multiple applications. The communication infrastructure used by the communications module 402 can include, but is not limited to an RF mesh network/PLC or cellular network or a combination of these. The communication network may be based on suitable standards as prevalent in the industry.

The metal shield 422 can be housed on top of the communications module 402 and can provide protection from the front to the communications module 402. A metal shield seal button cavity 426 for seal buttons 409, a metal shield display screen cavity 428 for display screen 404 and a metal shield optical port cavity 426 can be provided on the metal shield 422. A metal shield seal button cavity 426 houses the seal buttons 409, along with the seal button cavity 421 and recesses 316, 317 formed in the outer casing 401. The metal shield seal button cavity can be formed on the metal shield such that upon opening of the sealing element and the seal button, the authorized person can access the function switches for reset and start/stop. A metal shield optical port cavity 427 can house the metal plate 418 and the optical port cavity 405 formed on the outer casing 401. A metal shield display screen cavity 428 can house the display screen 404 of the communications module 402 along with a display screen cavity 429 formed in the outer casing 401. The metal shield display screen cavity 428 can be formed in the metal shield 422 and can receive the display screen 404 of the communications module. The metal shield 422 can be connected to the base 410 via screws and snap fit joints.

The metal shield optical port cavity 426 can be formed in the metal shield 422 such that the optical port lying below the communications module may be accessible via the external dongle. The optical port can protrude outward from the metal shield seal button cavity 426 and the optical port cavity 405. A metal plate can surround of the protruding optical port 405. A dongle can be directly connected to the optical port. The dongle can house a magnet, which can be mounted on the metal plate and the optical port to form a secure mounting.

The outermost part of the smart meter 400 can include an outer casing 401. The outer casing 401 may be configured from a transparent material. The outer casing 401 can be attached to the base 410 of the smart meter 400 via snap fit joints 440. Any attempt to remove the outer casing 401 without authorization may result in breaking of the snap fit joints, resulting in damage to the smart meter 40 itself. The outer casing 401 can include the display screen cavity 429, the optical port cavity 405 and the seal button cavity 421.

The display screen cavity 429 formed on the outer casing 401 can receive the display screen 404, which can pass through the metal shield display screen cavity 428. The display screen cavity 429 can be of the same size as that of the display screen 404. The optical port cavity 405 formed in the outer casing 401 can be configured to receive the optical port of the communications module 402, which can pass through the metal shield optical port cavity 427. The seal button cavity 421 formed on the outer casing 401 can be configured to receive the function switches for reset and start stop etc. The seal buttons 409 can be configured to cover the function switches to restrict any unauthorized use of the function switches.

The dongle 212 shown in FIG. 2B, can be securely mounted to the optical port cavity 405, and can be housed within the optical port cavity 406. The metal shield seal button cavity 426 and the optical port cavity 405 can be formed on the metal shield 422. The outer casing 401 can function as a housing or a top cover, which may not allow any lateral movement of the dongle 212 when mounted on the optical port. The outer casing optical port cavity 405 and the metal shield optical port cavity 426 can restrict the lateral movement of the dongle 212. The magnetic means of the dongle 212 and the metal plate can provide a firm grip to the dongle 212 on the smart meter. Therefore, the dongle 212 may be mounted on the smart meter 400 for longer durations without any movement or hindrance in working. Note that the dongle 212 is not shown in FIG. 4.

The terminal block 425 can be mounted on the base 410 of the smart meter 400, and below the communications module 402. The terminal block 425 can house the group of terminals described earlier, for example, with respect to FIG. 1. The terminal block 425 can be communicatively attached to the communications module 402. The terminal block 425 can include a plurality of terminals for current and voltage. The terminal block 425 can receive data from the communications module 402. A terminal cover 430 can cover the terminal block 425. The terminal cover 430 can be further attached to the outer casing 401 of the smart meter 400 by snaps 431. The terminal cover 430 can be configured to cover the terminal block 425 in its entirety. The terminal cover 430 can thus provide safety to the user from covering the exposed terminals of the terminal block 425.

The metering system described herein, can provide a smart meter, which can be flush and with no protruding elements. The disclosed embodiments can include a smart meter that can easily integrate with existing utility infrastructure because the meter can work on the same input and output as conventional meters, while providing convenient energy delivery, and real-time consumption monitoring and transactions. Furthermore, the disclosed embodiments can provide a smart meter, which is modular in functionality. The smart meter discussed herein can be based on modules, which can include the outer casing 401, the metal shield 422, the base 410, the terminal block 425, and the terminal cover 430 among other modular elements. The disclosed meter can be assembled easily without taking much time. For example, an operator while installing the disclosed smart meter may not take much time to install the entire device.

Based on the foregoing, it can be appreciated that a number of embodiments, preferred and alternative, are disclosed herein. In one embodiment can a meter casing can be configured which can include a metal shield; an outer casing comprising a display screen cavity that maintains a display screen; an optical port cavity that houses an optical port sensor assembly including a dongle; a seal button cavity that houses a seal button and a sealing element; and wherein the seal button cavity includes at least one recess cavity formed in the communications module cover.

In an embodiment, the optical port cavity can include a circular port to securely mount the dongle. An embodiment can also include snap joints for holding an optical port cover that covers the optical port with respect to the optical port cavity.

Additionally, in an embodiment, the dongle can include a magnet that can fix onto the optical port cavity.

In an embodiment, the at least one recess cavity can include a right-side recess cavity formed in the outer casing; a left-side recess cavity formed in the outer casing; and a button recess cavity formed within the seal button.

In an embodiment, the at least one recess cavity can be operable to receive the sealing element passing through the right-side recess cavity, the button recess cavity and the left-side recess cavity.

In an embodiment, a terminal cover can be attached to the outer casing with snaps.

In an embodiment, the metal shield can be configured to receive the outer casing.

In an embodiment, the metal shield can be configured to receive the seal button and the dongle.

In an embodiment, the recess cavity can be configured to restrict the movement of the sealing element.

In an another embodiment, a metering system can include a metal shield; an outer casing that includes at least one display screen and houses a communications module operable to communicate data, wherein at least some of the data is displayable on the at least one display screen, wherein the outer casing further includes an optical port that maintains a dongle, and a seal button cavity that maintains a seal button and a seal, wherein the seal button cavity comprises at least one recess cavity formed in the outer casing; and a terminal cover that houses a plurality of terminal for establishing a phase connection.

In an embodiment, the outer casing can include a communications module cavity, wherein the communications module is housed in the communications module cavity formed in the outer casing.

In an embodiment, the optical port can include a circular optical port cavity formed in the system to securely mount the dongle.

In an embodiment, the at least one recess cavity can include a right-side recess cavity formed in the outer casing; a left-side recess cavity formed in the outer casing; and a button recess cavity formed within the seal button.

In an embodiment, the at least one recess cavity can be operable to receive a sealing element passing through the right-side recess cavity, the button recess cavity and the left-side recess cavity.

In an embodiment, the dongle can include a magnet to fix onto the optical port cavity.

In an embodiment, an optical port cover can be included having snaps for holding the optical port cover to the optical port.

In an embodiment, a terminal cover can be included, which is attached to the communications module cover with snaps.

In an embodiment, the metal shield can be configured to receive the communications module cover.

In an embodiment, the metal shield can be configured to receive the seal button and the dongle.

In an embodiment, the recess cavity can be configured to restrict the movement of the sealing element.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A meter casing, comprising:
    a metal shield;
    an outer casing comprising:
        a display screen cavity that maintains a display screen;
        an optical port cavity that houses an optical port sensor assembly including a dongle;
        a seal button cavity that houses a seal button and a sealing element; and
        wherein the seal button cavity includes at least one recess cavity formed in the outer casing.

2. The meter casing of claim 1, wherein the optical port cavity comprises a circular port to securely mount the dongle.

3. The meter casing of claim 1, further comprising snap joints for holding an optical port cover that covers the optical port cavity with respect to the optical port cavity.

4. The meter casing of claim 2, wherein the dongle includes a magnet to fix onto the optical port cavity.

5. The meter casing of claim 1, wherein the at least one recess cavity includes:
a right-side recess cavity formed in the outer casing;
a left-side recess cavity formed in the outer casing; and
a button recess cavity formed within the seal button.

6. The meter casing of claim 5, wherein the at least one recess cavity is operable to receive a sealing element that passes through the right-side recess cavity, the button recess cavity and the left-side recess cavity.

7. The meter casing of claim 1, further comprising a terminal cover attached to the outer casing with snaps.

8. The meter casing of claim 1, wherein the metal shield can be configured to receive the outer casing.

9. The meter casing of claim 1, wherein the metal shield can be configured to receive the seal button and the dongle.

10. The meter casing of claim 1, wherein the at least one recess cavity can be configured to restrict a movement of the sealing element.

11. A metering system, comprising:
a metal shield;
an outer casing that includes at least one display screen and houses a communications module operable to communicate data, wherein at least some of the data is displayable on the at least one display screen, wherein the outer casing further includes an optical port that maintains a dongle, and a seal button cavity that maintains a seal button and a seal, wherein the seal button cavity comprises at least one recess cavity formed in the outer casing; and
a terminal cover that houses a plurality of terminals for establishing a phase connection.

12. The metering system of claim 11, wherein the outer casing includes a communications module cavity, wherein the communications module is housed in the communications module cavity formed in the outer casing.

13. The metering system of claim 11, wherein the optical port comprises a circular optical port cavity formed in the outer casing to securely mount the dongle.

14. The metering system of claim 11, wherein the at least one recess cavity includes:
a right-side recess cavity formed in the outer casing;
a left-side recess cavity formed in the outer casing; and
a button recess cavity formed within the seal button.

15. The metering system of claim 14, wherein the at least one recess cavity is operable to receive a sealing element passing through the right-side recess cavity, the button recess cavity and the left-side recess cavity.

16. The metering system of claim 11, wherein the dongle includes a magnet to fix onto the optical port.

17. The metering system of claim 11, further comprising an optical port cover having snaps for holding the optical port cover to the optical port.

18. The metering system of claim 11, wherein the terminal cover attaches to a communications module cover with snaps, wherein the metal shield can be configured to receive the communications module cover.

19. A method for assembling a meter, comprising:
providing a metal shield;
mounting an outer casing on the metal shield;
providing a display screen cavity on the outer casing for maintaining a display screen;
forming an optical port cavity on the outer casing for housing an optical port sensor assembly including a dongle; and
forming a seal button cavity on the outer casing for housing a seal button and a sealing element;
wherein the forming of the seal button cavity provides at least one recess cavity in the outer casing.

20. The method for assembling a meter of claim 19, wherein providing the at least one recess cavity includes:
forming a right-side recess cavity formed in the outer casing;
forming a left-side recess cavity formed in the outer casing; and
forming a button recess cavity formed within the seal button.

* * * * *